Jan. 2, 1962 R. D. GECKLER 3,015,209
MEANS FOR SUPPORTING A PROPELLANT CHARGE IN A ROCKET MOTOR
Filed Oct. 20, 1947 2 Sheets-Sheet 1

INVENTOR.
RICHARD D. GECKLER
BY Christie and Angus
ATTORNEYS

Jan. 2, 1962  R. D. GECKLER  3,015,209
MEANS FOR SUPPORTING A PROPELLANT CHARGE IN A ROCKET MOTOR
Filed Oct. 20, 1947  2 Sheets-Sheet 2

INVENTOR.
RICHARD D. GECKLER
BY
Christie and Angus
ATTORNEYS

United States Patent Office 3,015,209
Patented Jan. 2, 1962

3,015,209
MEANS FOR SUPPORTING A PROPELLANT CHARGE IN A ROCKET MOTOR

Richard D. Geckler, Pasadena, Calif., assignor, by mesne assignments, to Aerojet-General Corporation, Azusa, Calif., a corporation of Ohio
Filed Oct. 20, 1947, Ser. No. 780,965
9 Claims. (Cl. 60—35.6)

This invention relates to means for supporting a solid propellant charge within a rocket and has for its principal object to provide supporting means for such a propellant charge which will hold it firmly in place at all times and protect it from cracking and breaking, and will maintain the proper position of the charge in the rocket chamber during its burning period.

A rocket or rocket motor, of the type burning a solid propellant, ordinarily comprises a chamber containing the propellant with an exhaust nozzle leading from the chamber through which the gases of combustion or decomposition of the propellant escape at high velocity to create the reaction thrust which drives the rocket. The propellant charge in such a rocket is ordinarily a fast burning mass of a substance which includes in it the oxygen required for complete combustion or decomposition. A suitable propellant material which may be used, for example, is a modified alkyd resin matrix containing sufficient oxidizing material. The mass of the propellant may be cast or otherwise placed in the rocket chamber where it is ignited when it is desired to set off the rocket.

In some instances, the propellant charge is cast into the desired shape and form outside the rocket and then placed in the rocket chamber. In such cases, provision is often required for holding the charge, or grain as it is sometimes called, in the desired position in the motor chamber, especially when it is to be held in spaced relationship with reference to the chamber wall.

It is important to insure that just the proper area of propellant surface will burn in order that the proper amount of gases and pressure shall be formed within the rocket chamber. If, for example, the burning surface were to increase beyond that calculated for the rocket, as by fissures or by breaking up of the charge, the burning would proceed at a more rapid rate than desired and might produce an explosion. It is accordingly important to hold the propellant charge in the right position and to maintain it free from breakage, cracks and fissures and other damage, in order that the proper burning rate and consequent rocket operation shall be obtained. If such cracks, fissures or breakage should occur, the burning area would be undesirably increased.

In accordance with the present invention, means is provided for holding the propellant charge, or grain, at the correct position within the combustion chamber and free from damage, to provide for the proper burning surfaces with adequate venting and free egress of the gases of combustion through the exhaust nozzle. The nozzle supporting means comprises forward and rear supporting plates within the chamber positioned to hold the propellant charge or grain between them. The supporting plates are maintained in a general transverse position across the chamber while providing ample space for egress of gas past or through the plate.

A feature of the construction is the provision of supporting struts attached to the wall of the chamber itself for maintaining the pressure plates in their position.

A further important feature is the provision of oblique or dished surfaces for the plates which are in contact with the ends of the propellant charge. The propellant charge itself is then shaped to conform with the shape of these contacting surfaces. By this feature, the charge may be centrally positioned within the chamber when the end surfaces of the charge are maintained against the engaging surfaces of the supporting plates.

According to a further feature, at least one of the supporting plates is made adjustable in the forward and rearward direction so that the pressure on the propellant charge may be adjusted at will; and the adjustable plate is preferably located at the forward end of the chamber so that it is out of the way of the exhaust nozzle.

The supporting structure according to the present invention, is especially adapted for use with cylindrical formed propellant charges or grains; for by using this shape the grain can be supported in a central position within a cylindrical chamber while leaving the desired uniform annular space between the periphery of the charge and the inner wall of the chamber.

A popular form of cylindrical charge is one having a cylindrical outer surface and a hole coaxially through the center so that burning occurs both over the inner surface and the outer surface. In this way, the burning of the inner surface continually enlarges its area while the burning of the outer surface is decreasing the outer area; thereby maintaining the total burning area substantially constant throughout the burning period to provide a substantially uniform pressure within the chamber. Such a burning on the two surfaces requires ample means for egress of the gases. The construction of the novel pressure plates according to the present invention is particularly suitable for supporting such double surface propellant charges; and it provides a hole or holes through the plate and past its supports for the ready egress of the gases.

A preferred feature of the construction is the provision of dished or oblique or conical pressure surfaces related to each other to maintain uniform burning area.

A further feature is the provision for adjustment of the pressure holding the propellant charge.

The foregoing and other objects of my invention will be better understood with reference to the accompanying drawing of which:

Figure 1:
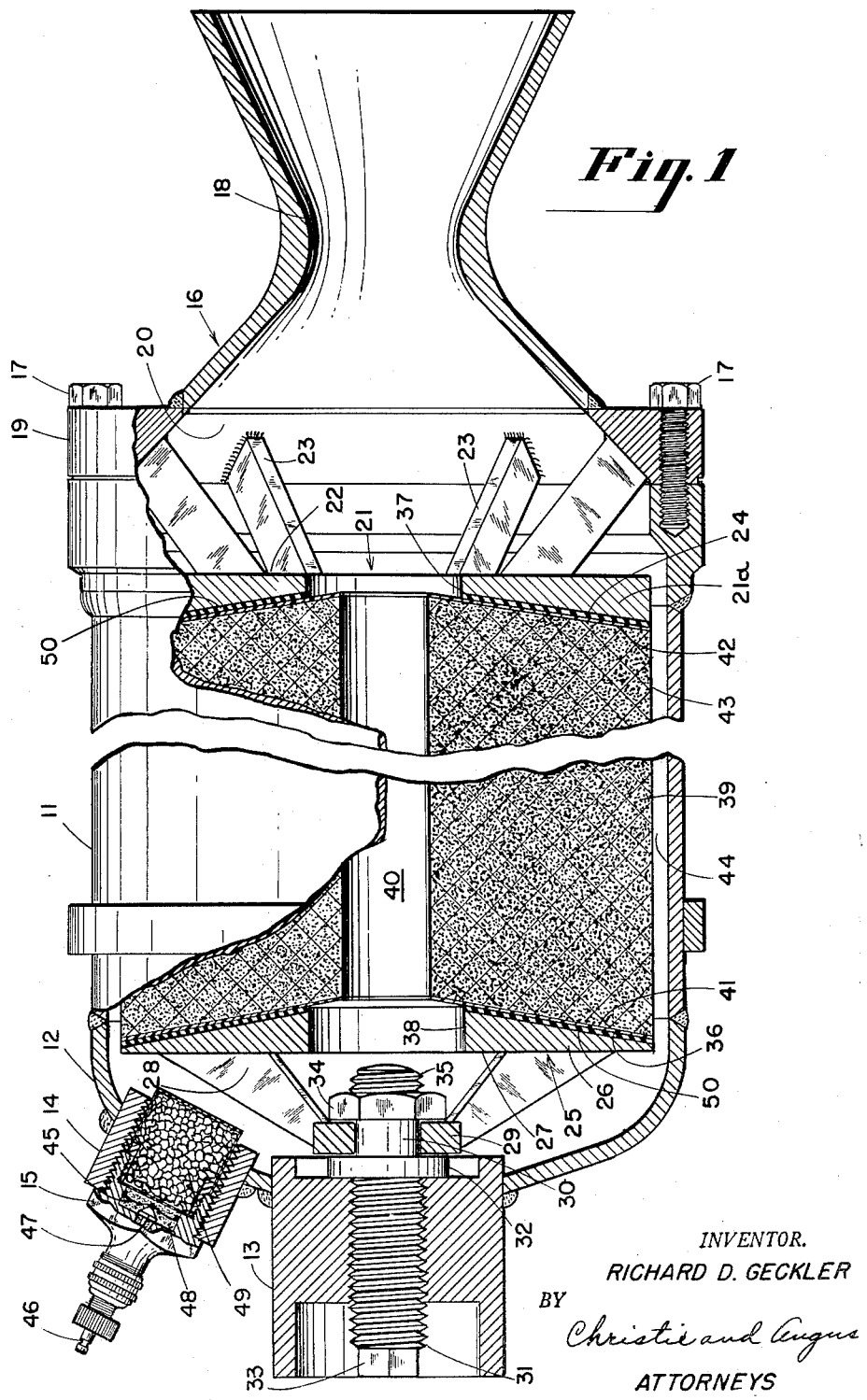
FIG. 1 shows a longitudinal cross section of a rocket motor with the propellant charge supported and arranged in accordance with the invention.
Figure 2:
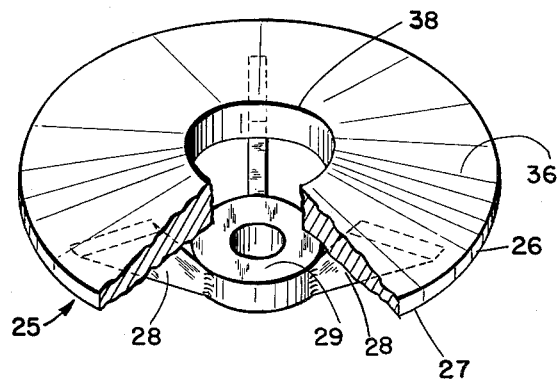
FIG. 2 is a perspective view of the forward supporting press plate and mount.
Figure 3:
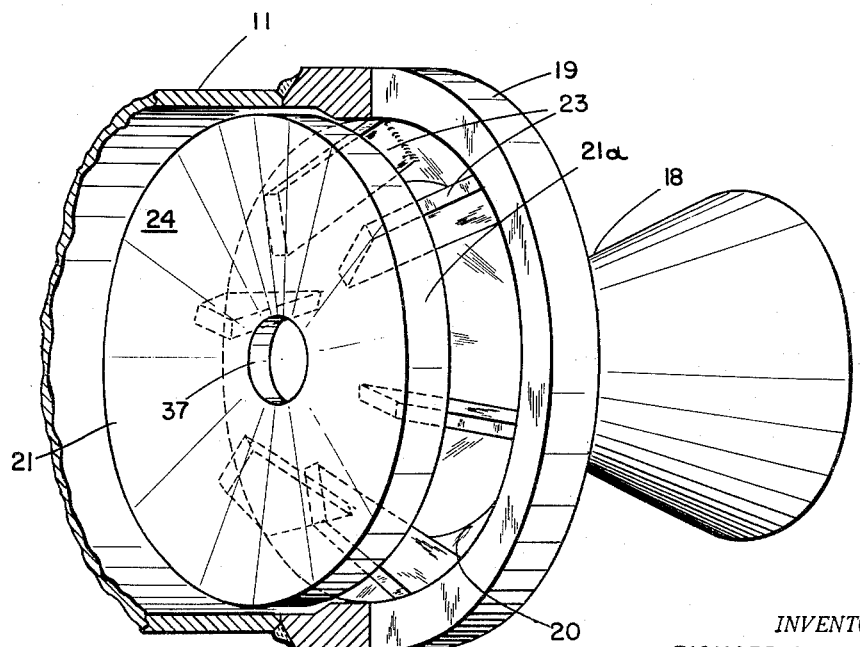
FIG. 3 is a perspective view partly in cross section showing the rear supporting plate in place on the nozzle mounting ring.

The rocket motor shown in the accompanying drawing comprises a cylindrical-shaped firing chamber 11 which contains a solid propellant charge 39. The chamber is provided at one end with a cap 12 having a centrally positioned boss 13; and also a second boss 14 into which an ignitor 15 is inserted to ignite the propellant charge within the chamber. The rear of chamber 11 is provided with an exhaust nozzle assembly 16 which is attached to the rear circular end of the firing chamber 11 by a plurality of bolts 17. Nozzle assembly 16 comprises a converging-diverging nozzle 18 preferably of the De Laval type which is attached securely to an annular member 19 having a larger outside diameter than the maximum outside diameter of the nozzle; and the nozzle 18 is preferably welded to the outer surface of cylindrical member 19. The inner surface of member 19 forms a frusto conical surface 20 which continues the slope of the inner converging surface of nozzle 18.

The propellant charge 39, or grain, as it is often called, has the general shape of a cylinder with an outer cylindrical surface 43. The propellant charge or grain is solid except for a cylindrical hole formed coaxial with the longitudinal axis and providing an inner cylindrical surface 40. The propellant charge is proportioned and arranged within the firing chamber so as to leave an annular space 44 between the inner cylindrical wall of the chamber and the outer cylindrical surface 43 of the propellant while aligning the longitudinal axis of the charge colinear with the longitudinal axis of the chamber so that the inner surface 40 of the propellant is centrally located within the chamber, as shown.

In the use of a solid propellant charge or grain of this character, the burning takes place simultaneously over the outer surface 43 and over the inner surface 40. All this burning is attended by profuse formation of gaseous combustion products which pass out the nozzle, and there is a violent combustion action going on which requires an effective and firm support to maintain the charge in its position within the chamber.

The support constructed in accordance with the present invention comprises a fixed rear press plate 21 and an adjustable forward press plate assembly 25. The rear press plate 21 comprises an annular ring 21a which has a side 22 facing the exhaust nozzle and in a plane perpendicular to the longitudinal axis of the motor chamber 11. The opposite side of ring 21a facing the forward end of the motor is in the form of a conical or dished surface 24 which slopes rearwardly from the outer periphery toward the center to the periphery of a central hole 37 through the ring. The hole 37 is preferably of larger diameter than the diameter of the cylindrical surface 40 of the propellant charge, to insure unrestricted gas flow to the exhaust nozzle. The disc 21a is supported in its position by a plurality of struts 23 which extend radially outwardly and rearwardly from the rear surface 22 of disc 21a to the inner conical surface 20 of member 19, and fastened by suitable means such as welding, etc.

The forward press plate assembly 25 comprises a ring 26 having its forward side 27 facing the forward end of the motor and lying in a plane perpendicular to the longitudinal axis of the motor. The opposite side of the ring 26 facing the nozzle end of the motor is shaped to form a conical surface 36 substantially parallel to the conical surface 24 of ring 21a. The ring 26 has a central hole 38 of substantially the same diameter as hole 37 of the rear ring 21a. The ring 26 is supported by a plurality of supporting vanes or struts 28, fixed rigidly at spaced distances apart on surface 27 of ring 26. These extend inwardly and forwardly to a ring 29 to which they are rigidly fastened.

The boss 13 is provided with a threaded bore coaxial with the longitudinal axis of the chamber; and there is threaded into the bore a bolt 31 which may conveniently be provided with a square or hexagonal head 33 to facilitate turning it.

Near the end of the bolt opposite from the head there is formed a collar 32 larger in diameter than the outside diameter of the thread and having threads 35 on the end, leaving an unthreaded bearing section 30 between the threads 35 and the collar 32.

The ring 29 which supports the thrust plate 26 is fitted over the rear end of the bolt and over the bearing section 30, where it is held by a lock nut 34 tightened down against the forward end of the threads 35 so that the ring 29 is snugly held on the bolt while allowing the bolt freely to turn within the ring. By this arrangement, the turning of the bolt head 33 by a suitable wrench, or the like, inserted within the outer recess of the boss 13 will turn the bolt and move it backwardly and forwardly between the limits permitted by the length of the bolt protruding forwardly from the threads of the boss when the collar 32 is in its most forward position, as shown in the drawing. Accordingly, by turning the bolt, the forward thrust plate or ring 26 is moved rearwardly and forwardly in the axial direction within the chamber.

The rear end of the propellant grain 39 is shaped to conform with the conical surface 36 of the forward press plate, and the rear end of the grain is made to conform with the conical surface 24 of the rear press plate. Both ends of the propellant grain 39, are coated with layers 41 and 42 of slower burning material than that of the propellant, to prevent or restrict burning of the ends of the propellant grain.

The thermal expansions of the material forming the propellant charge and the material of which the motor chamber is constructed differ considerably at high temperatures, the length of the metal chamber increasing much more than that of the propellant grain, therefore, even though the propellant grain is tightly clamped between the press plates at the time the charge is inserted in the motor, after the chamber is heated the greater expansion of the metal will cause the propellant charge to become loose and, may if a sufficiently long chamber is employed, permit the charge to fall from the supports. This difficulty is avoided by providing end pads 50 of compressible slow-burning materials such as cork, rubber, etc., and inserting these pads between the coated ends of the grain and the metal press plates. When the pads are in place the adjustable press plate is advanced as far forward as possible compressing the pads. When the motor expands on heating the compressed material will be able to expand and still fill the space between the coated end of the propellant grain and the surface of supporting press plates. In this manner the grain is securely supported throughout the entire burning period.

A suitable material for the propellant is, for example, a thermosetting alkyd resin with an inorganic oxidizer such as potassium perchlorate added thereto, although it will be understood that other propellant materials might be used instead. The propellant grain or charge may easily be positioned within the chamber by first removing the rear ring 19 and its assembly including the exhaust nozzle and the rear press plate 21. The forward thrust plate assembly is placed in the position shown with the ring 29 mounted on the bearing 30 of the bolt preferably while the bolt is in its most forward position with the collar 32 against the end of the boss 13. In this position, the conical forward end of the propellant charge is placed on the conical surface of the forward thrust plate; and since the conical surface of the charge and of the plate correspond with each other, the propellant charge will readily be centrally positioned by putting the surfaces exactly together. Then the rear portion of the chamber comprising the nozzle and the rear thrust plate are applied by fastening the annular member 19 to the rear end of the chamber by the bolts 17. This will place the conical surface 24 against the corresponding rear end surface 42 of the charge. The charge is then tightened securely in this position by turning down on the head 33 of the bolt to move the forward thrust plate assembly 25 rearwardly to compress the charge between the two end thrust plates; and sufficient pressure should thus be exerted to hold the charge firmly within the chamber while not crushing it. In this way, the charge is firmly held in a desired central position within the chamber, accurately aligning it coaxially therein and leaving the desired uniform annular space between the exterior cylindrical surface of the charge and the inner surface of the chamber.

The charge may then be fired in a well-known manner by means of the ignitor 15 which may be of a known type comprising a hot wire 45 through which a current flows when an ignitor switch is thrown to send the current from the cable wire or lead 46, through the insulator 47 to one end of the wire 45, the opposite end of which is grounded by connecting it with the metal frame of the ignitor and the motor. The hot wire ignites a suitable charge of inflammable powder 48, or the like, which in turn ignites a mass of ignitable pellets 49 or the like which sends a heavy flame into the chamber of the motor over both the outer cylindrical surface and the inner cylindrical surface 40 of the propellant grain 39. This igniting flame travels from the ignitor over the outer propellant surfaces 43, and also to the inner surface 40 through the spaces between the struts 29 and hole 38 of the forward thrust plate assembly.

When the inner and outer burning surfaces of the propellant charge or grain are thereby ignited, rapid combustion occurs evenly over those surfaces, and while the propellant is thus being consumed, the diameter of the outer surface will continually decrease while the diameter of the inner surface 40 will continually increase until the charge is consumed. While this is going on, the large amount of gases develop at high pressure, sending the gases out through the annular space 44 through the spaces between struts 33 to the rear nozzle, and also through the holes 38 and 37 to the rear nozzle where they are exhausted with great velocity. All the while this is going on, the propellant charge assembly is firmly held in this position and will not move because the unconsumed conical surfaces of the propellant are still engaged by the front and back press plates so that the charge cannot move.

The burning occurs substantially uniformly over the outer cylindrical surface and over the inner cylindrical surface, thereby steadily decreasing the area of the outer surface while increasing the area of the inner surface. This tends to maintain a substantially uniform overall burning surface. The uniformity of the burning rate is furthermore enhanced by the fact that the end conical or dished surfaces 41 and 42 are substantially parallel to each other so that at any radius from the axis of the chamber, the distance from the front end to the back end of the propellant charge is substantially constant. Thus, the opposed parallel conical surfaces not only hold the charge in its centered position, but also are shaped to maintain a substantially constant burning area.

To insure that the burning will not occur in between the press plates and the ends of the propellant charge, the ends of the propellant are preferably coated with a substance which burns slower than the material of the propellant grain itself. When a thermosetting alkyd resin base propellant is used a suitable coating substance is a furane thermosetting resin free of any oxidizer which may be bonded to the propellant surface.

The secure holding of the propellant grain in this manner avoids cracking and prevents breaking up of the propellant charge. Manifestly, if the charge were to break up before it is consumed, large particles would be thrown violently into the exhaust nozzle and clog it up, preventing the normal egress of gases. This would of course, create an explosion, as would also an excessive burning rate due to excessive cracking.

Even if the charge tends to crack and break up near the end of the experiment period when the amount of unconsumed charge becomes small, the danger of large pieces of the charge breaking up and clogging the nozzle are avoided because the maximum sizes of such particles is limited by the spacing between the thrust 33 and by the diameter of hole 37. Preferably these spaces and diameter are small enough with relation to the diameter of the nozzle 18 so that such particles will readily blow out.

It will be recognized that by the present invention there is provided an effective and positive means of holding in its desired central position a propellant charge while allowing burning over its burning surfaces and without danger of dislodging of the charge. Furthermore, the charge can readily be shipped within the chamber without danger of cracking and breaking because of the secure manner in which its ends are held.

It should be understood that the invention is not necessarily limited to use with cylindrical formed grains having both inner and outer exposed surfaces. It might be used also for other shaped propellant grains, for example, a propellant which is allowed to burn only on the outer surface or only on the inner surface. The invention is not limited except in accordance with the scope of the appended claims.

I claim:
1. In combination with a reaction motor comprising a firing chamber and an exhaust nozzle attached to said firing chamber, a press plate secured to said nozzle by a plurality of vanes, a boss symmetrically disposed in the forward end of the firing chamber of said motor, said boss being provided with a threaded bore, an adjusting bolt threaded into said boss, said bolt being provided with a flange and a bearing surface adjoining said flange, a forward press plate, a plurality of vanes secured at one end to said forward press plate and at the other end to an annulus, the opening of said annulus being proportioned to fit snugly the bearing surface of said bolt, and means for securing said annulus on the bearing portion of said bolt.

2. In combination with a reaction motor comprising a firing chamber and an exhaust nozzle attached to said firing chamber, a concave frusto conical press plate secured to said nozzle by a plurality of vanes, a boss symmetrically disposed in the forward end of said firing chamber, said boss being provided with a threaded bore, an adjusting bolt threaded into said boss, said bolt being provided with a collar and a bearing portion adjoining said collar, a forward frusto conical press plate, a plurality of vanes secured at one end to said forward press plate and at the other end to an annulus, the opening of said annulus being proportioned to fit the bearing surface of said bolt, and means for rotatably securing said annulus to the bearing portion of said bolt.

3. Apparatus according to claim 2 in which the forward and rearward frusto conical press plates are provided with a circular opening in the center.

4. In a rocket motor having a firing chamber and an exhaust nozzle from the chamber, means for supporting a solid propellant charge within the chamber, said means comprising a forward annular plate and a rear annular plate, each of said plates being situated within the chamber transverse to the longitudinal axis passing through the chamber and to the exhaust nozzle, and supporting strips with spaces therebetween for supporting each of said plates in spaced relation from the side of the chamber, whereby the propellant charge may be held between the plates, the rear plate being fixed with relation to the chamber and the forward plate being movable with relation to the chamber, said forward plate being provided with a collar located at the longitudinal axis, and a threaded screw passing coaxially through the forward wall of the chamber, so that the screw may be turned from outside the chamber and when turned it moves in a forward and rearward direction, said collar being mounted on said screw within the chamber, so as to move the forward plate in correspondence with movement of the screw.

5. Means for supporting a solid propellant charge in the firing chamber of a reaction motor provided with an exhaust nozzle, said means comprising a clamping plate attached to the nozzle end of the motor, said plate having a concave frusto-conical surface for engagement with a corresponding surface at the rear end of the charge, and a forward convex frusto-conical pressure plate at the forward end of said motor, said last-mentioned pressure plate having a collar provided with a hole, and a stud extending through the forward wall of the motor and through said hole, whereby the forward pressure plate is rotatably mounted on said stud, said forward pressure plate having a convex frusto-conical surface for engagement with a corresponding surface at the forward end of the charge.

6. Means for supporting a solid propellant charge in the firing chamber of a reaction motor provided with an exhaust nozzle, said means comprising a clamping plate attached to the nozzle end of the motor, said plate having a concave frusto-conical surface for engagement with a corresponding surface at the rear end of the charge, and a forward convex frusto-conical pressure plate at the forward end of said motor, said last-mentioned pressure plate having its position adjustable in a longitudinal direction and being rotatably supported with respect to the chamber, the surfaces of the pressure plates in contact with the propellant charge being provided with pads of resilient compressible material whereby when the forward conical pressure plate is advanced to clamp the charge, the resilient material compresses to a fraction of its original thickness.

7. Means according to claim 6 in which the resilient material is of cork.

8. Means according to claim 6 in which the resilient material is of rubber.

9. In a rocket motor having a firing chamber and an exhaust nozzle from the chamber, means for supporting a solid propellant charge within the chamber, said means comprising a forward annular plate and a rear annular plate, each of said plates being situated within the chamber transverse to the longitudinal axis passing through the chamber and to the exhaust nozzle, and supporting strips with spaces therebetween for supporting each of said plates in spaced relation from the side of the chamber, whereby the propellant charge may be held between the plates, the rear plate being fixed with relation to the chamber and the forward plate being movable with relation to the chamber, said forward plate being provided with a collar located at the longitudinal axis, and a threaded screw lying along said longitudinal axis and engaging an opening through the forward wall of the chamber, so that the screw may be turned from outside the chamber and when turned it moves in a forward and rearward direction, said collar being mounted on said screw within the chamber, so as to move the forward plate in correspondence with movement of the screw.

References Cited in the file of this patent

UNITED STATES PATENTS

| | | |
|---|---|---|
| 2,145,507 | Denoix | Jan. 31, 1939 |
| 2,421,522 | Pope | June 3, 1947 |
| 2,447,758 | Lubbock et al. | Aug. 24, 1948 |

FOREIGN PATENTS

| | | |
|---|---|---|
| 578,261 | Great Britain | June 21, 1946 |